Sept. 26, 1967    R. J. MULLIGAN ETAL    3,343,567
COLLAPSIBLE TUBING
Filed June 1, 1964
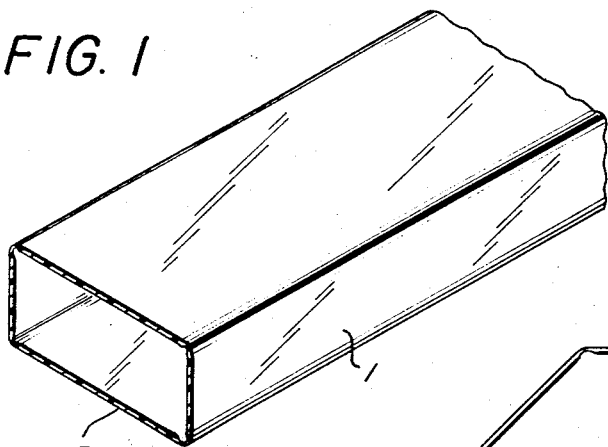
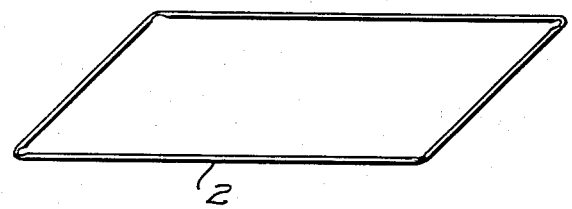
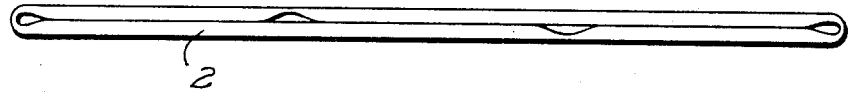
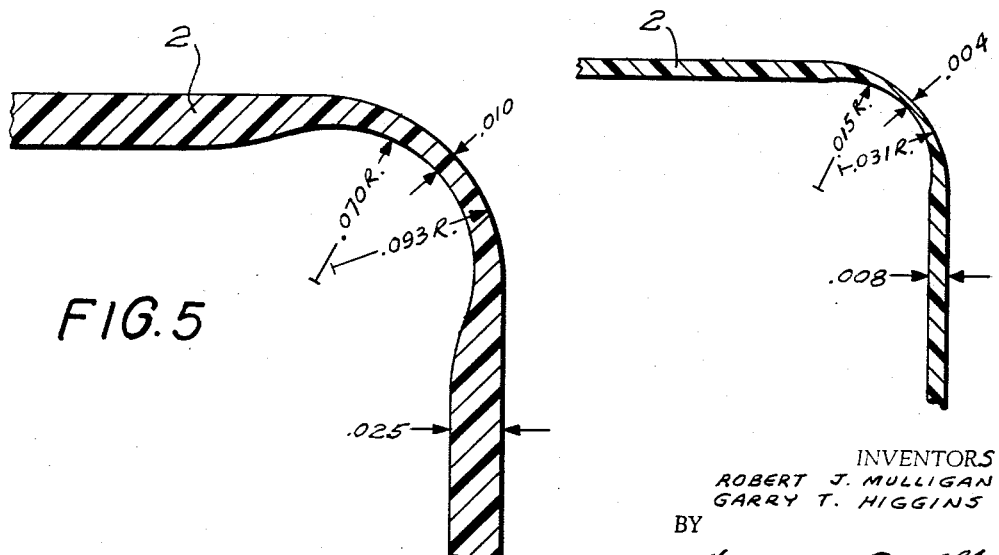
INVENTORS
ROBERT J. MULLIGAN
GARRY T. HIGGINS
BY
ATTORNEY 3,343,567
COLLAPSIBLE TUBING
Robert J. Mulligan, Westport, and Garry T. Higgins, Cos Cob, Conn., assignors to Richardson-Merrell Inc., New York, N.Y., a corporation of Delaware
Filed June 1, 1964, Ser. No. 371,430
4 Claims. (Cl. 138—119)

This invention relates to collapsible, extruded plastic tubes and to a process of preparing the same. Although extruded plastic tubing of rectangular cross section is the most popular form to which the present invention may be applied, the invention is also useful in preparing extruded plastic tubes of any polygonal cross section so long as the cross section can be divided into two halves of equal length. Included are squares, rectangles, parallelograms, hexagons, octagons, and others of more irregular cross sectional configuration.

Extruded plastic tubing is a popular material for use in forming the side walls of inexpensive containers. Unfortunately, the tubing is comparatively bulky and occupies a great deal of space, thus making storage and transportation charges unduly high. This problem is overcome in the paperboard container art by cutting out blanks of the flat paperboard stock and scoring it along lines which are to be bent in assembling the finished container. The flat sections can then be glued together, usually along one seam on the side and the folded blanks are packed in boxes for shipment and storage without loss of valuable space. When it is desired to form boxes from these blanks, they are assembled, filled, and closed with automatic machinery.

It is not possible to treat extruded plastic tubing in the same way. The thin plastic material does not lend itself to scoring by compression as in the case of the compressible paperboard, and no means has yet been devised for scoring the interior corners of an endless plastic tube. Accordingly, it has been necessary up to the present time to extrude the plastic into long tubes of desired cross section, cut them into lengths, pack these thin, lightweight sections in boxes, and ship and store them in their unflattened, bulky form as extruded. Obviously, this adds expense to the final container.

Although plastic sheet material has been scored and the blanks subsequently folded into plastic containers as in the case of paperboard, this operation cannot be performed upon endless extruded tubing as in the case of the present invention which provides collapsible, seamless, extruded plastic tubing of polygonal cross section. Usual methods of scoring flat plastic sheet material also tend to weaken the sheet at the score line and cracks often develop.

In order that the present invention may be more clearly understood, reference is made to the accompanying drawing in which:

FIGURE 1 is a perspective of a section of a rectangular extrusion in accordance with the present invention;

FIGURE 2 is a cross-section of rectangular tubing in semi-collapsed form;

FIGURE 3 shows a cross-section of rectangular tubing of the present invention in collapsed position ready for packaging;

FIGURE 4 is a cross-section, greatly enlarged, of one of the corners of the extruded tubing showing the several minimum dimensions; and FIGURE 5 is another enlarged cross-sectional view of a corner of the extruded tubing of the present invention with maximum dimensions indicated.

The extruded tubing of the present invention is extruded through an extrusion die constructed to produce a reduced cross section at the angle substantially as shown in the accompanying drawing. The extruded material may be any of the plastic compositions which are presently used to make extruded tubing with the requirement, however, that the percent elongation of the material be at least 20. This includes such plastic substances as most commercially available grades of cellulose acetate, cellulose propionate, cellulose butyrate, most grades of polyethylene and polypropylene, nylon, most vinyl polymers and copolymers, some polystyrene polymers, and other plastic compositions. The percent elongation is an important criteria because those substances which have a lesser ability to withstand elongation tend to crack when the plastic extrusion is flattened and strain is applied to the corners.

Referring again to the drawing, FIGURE 1 depicts a section of extruded tubing 1 having thin side walls 2. These sections may be of any polygonal cross-section as noted above, so that the sections can be collapsed as shown in FIGURE 3 in the case of rectangular shapes. The mold, or orifice, through which these extrusions are formed is carefully designed to give extrusions with corners of reduced thickness as shown in FIGURES 4 and 5. As will be noted, these corners are thinner than the walls of the tubing, being approximately half as thick as shown in the drawing. Generally speaking, they may have a minimum thickness of 0.004 inch up to about 0.010 inch. The side walls of the tubing may vary from about 0.008 inch in thickness to 0.025 inch. The radii of the corners may have the maximum and minimum dimensions shown in the drawing, the outermost radius being, of course, larger than the innermost. The radius of the outer corner may vary from about 0.031 inch to about 0.093 inch whereas the inner corner may have radii from about 0.015 inch to 0.070 inch.

As will be apparent from the foregoing description, the thin extruded shapes may be collapsed as shown in FIGURE 3, packaged, stored, and shipped to the ultimate user where they may be further processed into containers of various kinds. The saving in shipping and storing made possible by the present invention is considerable in this highly competitive art.

What is claimed is:

1. A seamless polygonal extrusion of plastic material having a percent elongation of at least 20 having side walls of uniform density and composition and being between 0.008 inch in thickness to 0.025 inch characterized by having at the corner angles a thiner cross-section between about 0.004 inch and 0.010 inch whereby the said extrusion can be collapsed to a substantially flat shape.

2. A seamless rectangular extrusion of plastic material having a percent elongation of at least 20 characterized by having side walls of uniform density and composition and being within the range 0.008 inch to 0.025 inch, corner walls of a thickness within the range 0.004 inch to 0.010 inch, an exterior corner radius of between about 0.031 inch to about 0.093 inch and an interior radius within the range 0.015 inch to 0.070 inch whereby the said rectangular extrusion can be collapsed to a substantially flat shape.

3. A seamless polygonal extrusion in accordance with claim 1 in which the plastic is cellulose butyrate.

4. A seamless polygonal extrusion in accordance with claim 1 in which the plastic is cellulose acetate.

References Cited

UNITED STATES PATENTS

| | | | |
|---|---|---|---|
| 347,416 | 8/1886 | Buckingham | 138—119 |
| 2,212,733 | 8/1940 | Grigsby | 138—119 X |
| 2,371,556 | 3/1945 | Steffens et al. | 138—119 X |
| 2,770,406 | 11/1956 | Lane. | |
| 3,301,430 | 1/1967 | Cornelius | 220—31 |

FOREIGN PATENTS 143,296  7/1935  Austria.

LAVERNE D. GEIGER, *Primary Examiner.*

B. E. KILE, *Assistant Examiner.*